May 21, 1963 A. DURGET 3,090,203
SUPPORT PLATE FOR AN ANCHORING DEVICE
Filed Feb. 27, 1959 3 Sheets-Sheet 1
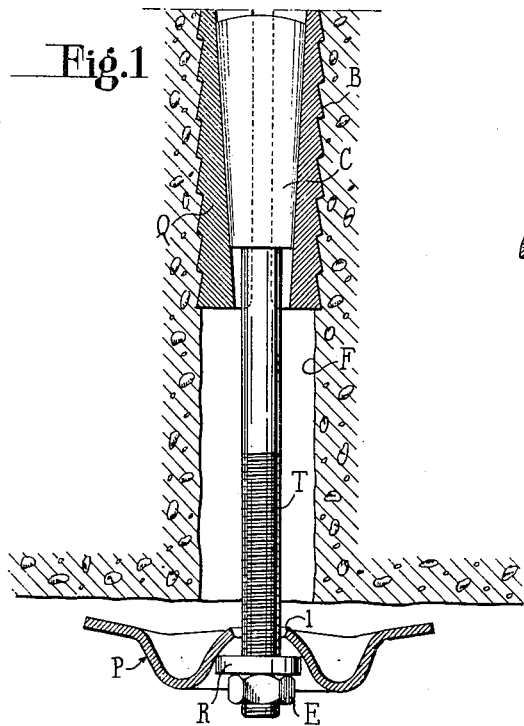
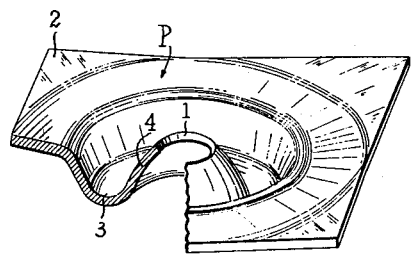
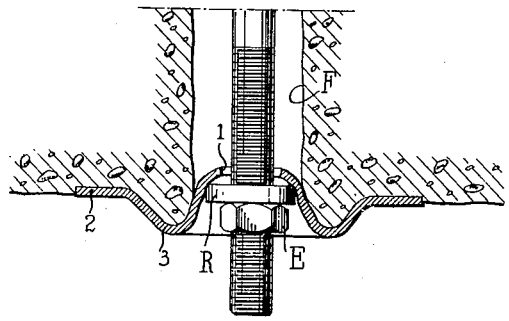

May 21, 1963 A. DURGET 3,090,203
SUPPORT PLATE FOR AN ANCHORING DEVICE
Filed Feb. 27, 1959 3 Sheets-Sheet 2
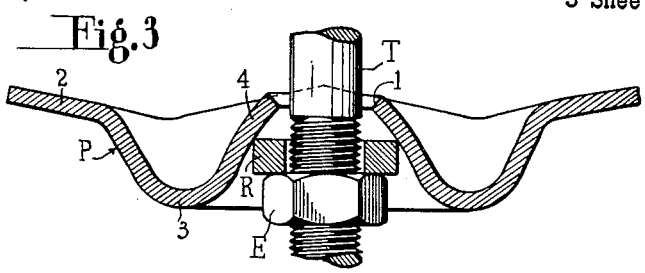
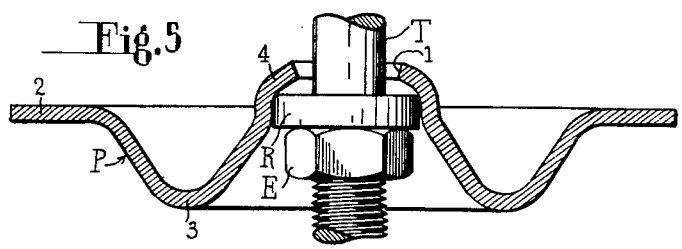
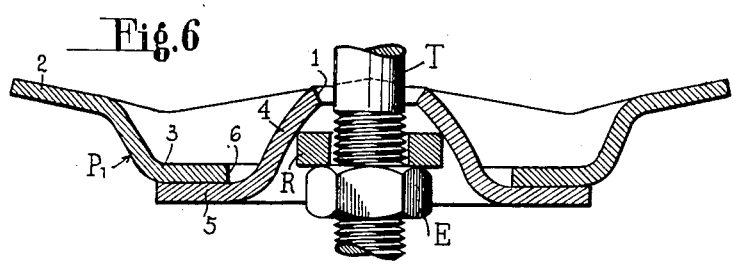
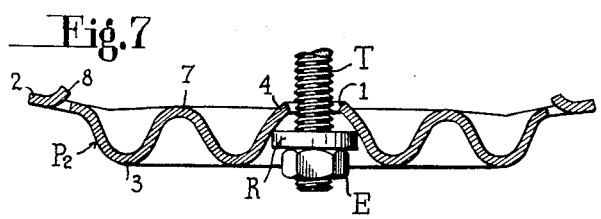
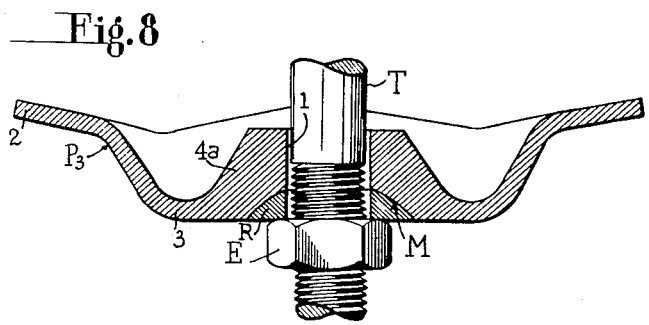

May 21, 1963  A. DURGET  3,090,203
SUPPORT PLATE FOR AN ANCHORING DEVICE
Filed Feb. 27, 1959  3 Sheets-Sheet 3

United States Patent Office 3,090,203
Patented May 21, 1963

3,090,203
SUPPORT PLATE FOR AN ANCHORING DEVICE
André Durget, Saverne, France, assignor to Anciens Etablissements Goldenberg & Cie, Zornhoff (Bas-Rhin), France, a French body corporate
Filed Feb. 27, 1959, Ser. No. 796,041
Claims priority, application France Mar. 3, 1958
5 Claims. (Cl. 61—45)

The present invention relates to support elements or plates for anchoring devices used notably in mines for supporting the roofing or when it is desired to obtain a fixed support point by insertion of the anchoring device in a bored hole after which the device is expanded.

Heretofore, the practice has been merely to use a simple flat plate which is provided with a central aperture for the passage of the traction rod of the anchoring device and against which bears an element connected to the tightening means exerting traction on the traction rod. These support plates, in bearing against the front face of the material surrounding the bored hole, permit obtaining the final expansion of the anchoring device and subsequently hold the anchoring device in position. Owing to the generally irregular nature of the face of the material surrounding the bored hole, a flat support plate bears imperfectly on this face and the small area of contact does not ensure that the anchoring device behave in a satisfactory manner particularly when there occurs a deformation in the surrounding material.

To avoid these difficulties, it is often necessary to resort to expedients, such as the insertion of weak or rather unstable wooden wedges between the support plate and the face of the material surrounding the bored hole.

Further, it often occurs that an achoring device must be introduced into a bored hole whose axis is not perpendicular to the front face surrounding the hole. In this case, it is not possible with conventional flat support plates to obtain a satisfactory anchoring because the element which is connected to the traction means of the anchoring device and bears against the plate, only bears against the latter on a limited part of its surface.

The object of the invention is to remedy these drawbacks and provide an improved support plate comprising an inner region which is depressed relative to the periphery of the plate, this depressed region being capable of being deformed in the course of tightening the anchoring device.

The depressed or indented region of the support plate has an annular shape so that the abutment element of the tightening or traction means of the anchoring device can be disposed with an inclination corresponding to that of the axis of the bored hole relative to the front face around the hole, even when this axis is inclined relative to this front face.

With this arrangement, it is possible to exert on the support plate a high pressure which is the better distributed and transmitted to the ground as the deformation of the plate permits the latter to conform more closely to the profile of the front face surrounding the bored hole even when the axis of the bored hole is inclined.

According to another feature of the invention, the difference in the levels of the indented of depressed region and the periphery of the plate is variable so as to permit defining the elastic or permanent deformability of the support plate. It is, moreover, advantageous in this respect to arrange that the peripheral portion of the plate is upwardly and outwardly inclined, the decrease in this inclination in the course of tightening the anchoring device contributing in the deformation of the whole of the plate.

According to another feature, the central region of the plate surrounding the aperture for the passage of the shank of the bolt protrudes from the depressed region.

Further features and advantages of the invention will be apparent from the ensuing description with reference to the accompanying drawings, to which the invention is in no way restricted.

In the drawings:

FIG. 1 is an axial sectional view of a support plate embodying the invention in position on an anchoring device, before expansion of the latter;

FIG. 2 is a perspective view, with a part cut away, of the plate shown in FIG. 1;

FIG. 3 is an axial sectional view of the plate shown in FIG. 2 on an enlarged scale;

FIG. 4 is a partial sectional view similar to FIG. 1, showing the plate after expansion of the anchoring device;

FIG. 5 is an axial sectional view, on an enlarged scale, of the plate in the position it occupies in FIG. 4;

FIGS. 6 to 8 are axial sectional views of three modifications of the support plate of the invention;

Figure 9:
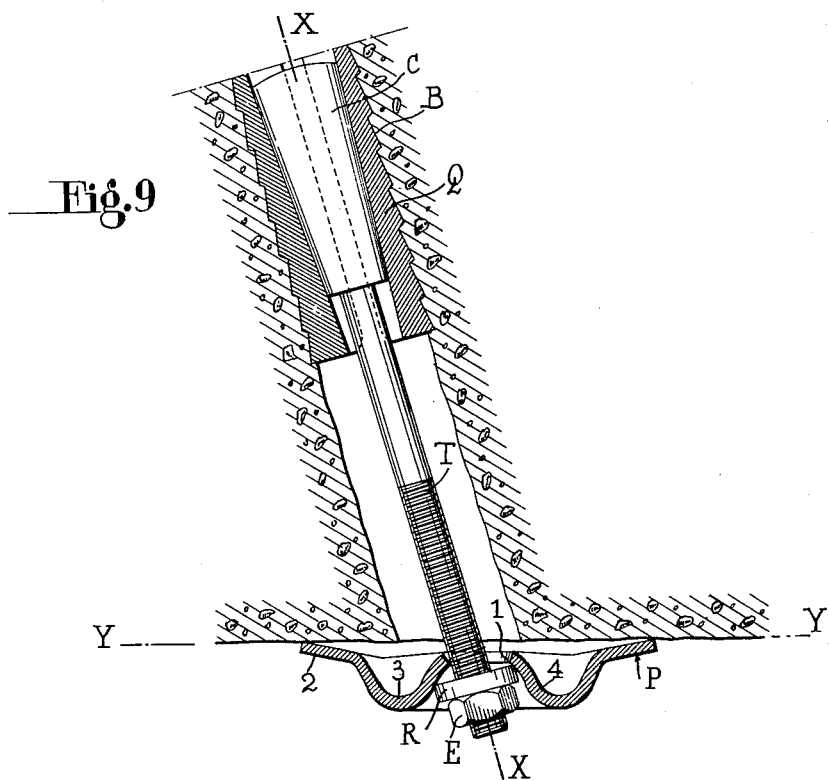
FIG. 9 is an axial sectional view of a support plate of the type shown in FIG. 3, in position on an anchoring device inserted in an inclined hole.

The metal element or plate P embodying the invention has been shown in FIG. 1 in its position of utilization to illustrate its function. The plate has a central aperture 1 and, in the presently-described embodiment, is rectangular, the plate being mounted on the shank or rod T of an anchoring device or bolt B after the latter has been inserted in a bored hole F. The bolt B has been shown diagrammatically to comprise two half-shells Q between which is inserted a wedge C connected to the rod T. Screw-threadedly mounted on the outer screw-threaded end of the rod T is a nut E which bears against the plate P through the medium of a washer R. When the nut E is rotated, the plate is applied against the front face of the material surrounding the bored hole F and thenceforth any further screwing of the nut causes the wedge C to move downwardly between the half-shells Q, which anchors the bolt B in the walls of the bored hole and in consequence supports the roofing.

According to the invention, the plate P is arranged in such manner that its function of a support for the anchoring bolt is improved. To this end, the plate comprises (FIGS. 2 and 3) a peripheral outer portion 2 which is upwardly and outwardly inclined to which is connected an indented or depressed annular intermediate portion. The latter is limited inwardly by an annular inner portion 4 which is, as shown, substantially in the shape of a dome truncated by the aperture 1, the latter being substantially on the same level as the peripheral portion 2. The configuration of the plate just described may be easily obtained by pressing this plate out of a steel strip.

FIGS. 4 and 5 show the plate just described after the nut E has been tightened. The peripheral outer portion 2 of the plate has flattened against the front face of the material surrounding the bored hole F whereas the washer R (which could correspond if desired to the shape of the bottom face of the portion 4) has acted in the manner of a punch so as to press in the portion 4 and the bottom of the intermediate portion 3. The latter is thus greatly deformed inside the bored hole, the front face of the material surrounding the latter being caused to conform to the profile of the support plate (FIG. 4).

There is therefore obtained a pre-stressing of the ground before final expansion of the anchoring bolt occurs. This final expansion, obtained by bearing against the support plate which is securely anchored on a compressed and consolidated ground, is therefore very effective. The behaviour of the anchoring is therefore so much improved. Further, the plate is still capable of being deformed either elastically or in a permanent manner under the effect of the forces due to the deformation of the ground and thus balances the forces to which the anchoring bolt is therefore subjected.

The plate of the invention could have shapes other than that just described and three modifications have been shown in FIGS. 6–8.

The element or plate $P_1$ shown in FIG. 6 differs from that shown in FIGS. 1–5 in that the inner annular portion 4 and its aperture 1 are provided on an attached element 5. To this end the plate $P_1$ comprises a large aperture in its intermediate portion 3 through which aperture extends the projection 4 of the element 5. The latter bears against the lower face of the portion 3 by its periphery. This embodiment could be advantageous in the event that the aperture 1 must have different dimensions for adaptation to variable diameters of the rods T. A single type of plate $P_1$ could be used to which suitable elements 5 are attached.

The plate $P_2$ shown in FIG. 7 is similar to that shown in FIGS. 1–5 except that its intermediate portion 3 is corrugated at 7 which increases its resilience. Thus, in the intermediate portion one or more corrugations could be provided, the crests of these corrugations being circular or rectilinear. Furthermore, the plate $P_2$ comprises on its outer portion 2 claws or lugs 8 which are provided by lancing the metal and which when they penetrate the ground, prevent rotation of the plate when the nut E is being rotated. The claws 8 could be provided in any part of the plate adapted to bear against the front face of the material surrounding the bored hole F.

In practice, the axis X—X (FIG. 9) of the bored hole is not perpendicular to the plane Y—Y of the front face of the hole. In consequence, the washer R and the nut E are not parallel with the plane Y—Y and if the support plate P were a conventional plane plate applied against the front face of the hole, the washer R, which would be inclined relative to the plate P, would bear against the latter only in a limited area. A satisfactory anchoring could not be obtained under these conditions.

On the other hand, this disadvantage is avoided with the plates of the invention. Owing to the hollow annular inner portion 4, the washer R is capable of inclining at a relatively large angle relative to the plane Y—Y without losing an annular contact with the inner wall of the projection 4. It is in this way possible to obtain a normal tightening of the nut E to ensure the final expansion of the anchoring device B, as can be seen in FIG. 9.

Thus the support plate of the invention can be used in all cases without need to adapt the plate to the various conditions encountered. In mines, where the simplest possible mounting of the anchoring device is required for obvious reasons, this is a big advantage.

Figure 10:
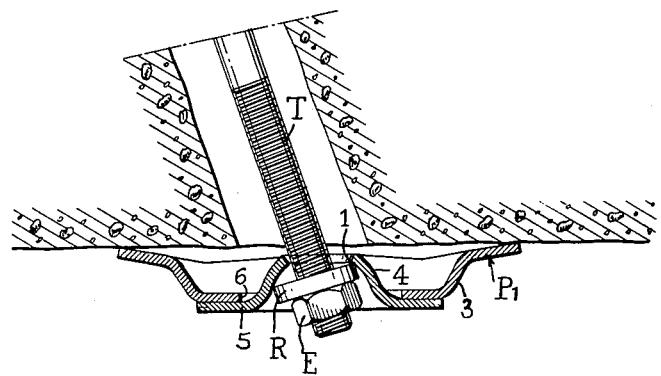
FIG. 10 is a partial sectional view similar to FIG. 9 of a modification of the support plate of the type shown in FIG. 6, applied to an inclined hole.

FIG. 10 shows another support plate $P_1$ already described with reference to FIG. 6 and which, like the plate P shown in FIG. 9, can be used for inclined anchoring devices.

FIG. 8 shows another possible shape of the plate, this plate $P_3$ being similar to the plate P except that its central portion $4^a$ is solid instead of hollow. In this case, the deformation of the plate occurs essentially at the bottom of the intermediate portion 3. The portion $4^a$ has a concave dome shaped bottom bearing surface as shown at M and the washer R has a corresponding convex dome-shaped upper face so as to permit the anchoring device to assume other orientations.

Although specific embodiments of the invention have been described, many modifications and changes may be made therein without departing from the scope of the invention as defined in the appended claims.

Thus, the outside shape of the plates could be other than rectangular, for example circular or polygonal. The plates could be suitably heat treated so as to possess the desired mechanical characteristics.

Having now described my invention what I claim as new and desire to secure by Letters Patent is:

1. The combination of an anchoring expansion bolt inserted in a hole bored in a wall such as a roof and a support element for the bolt, the expansion bolt having a shank, a screw-thread on the end of the shank extending out of the hole, tightening means screwthreadedly engaged on the screwthreaded end of the shank, the support element comprising in the free unclamped state a peripheral outer portion for bearing against said wall, an annular inner portion, a central aperture defined by said inner portion and provided for the shank, and an annular intermediate portion interconnecting said inner portion and said outer portion, the support element having such shape in radial section through said aperture that in said outer portion the support element is substantially rectilinear and in said intermediate portion and said inner portion the support element extends downwardly from said outer portion and upwardly to said aperture in an approximately sinusoidal fashion, said inner portion having a bottom face substantially in the shape of a concave dome truncated by said aperture, the shank extending through said aperture and the tightening means having a circular bearing face engaging said bottom face around substantially the entire periphery of said bearing face and exerting a clamping force on the support element when the tightening means are screwed along the shank, and the size of said aperture being much larger than the size of the shank so as to permit the latter to assume any of a wide range of inclined positions in the support element, the entire periphery of said bearing face engaging said bottom face at all times due to said dome shape of the latter.

2. The combination as claimed in claim 1, wherein the size of said inner portion is smaller than the size of said hole bored in the wall, whereby when the support element is clamped by the screwing of said tightening means along said shank the inner portion is drawn into said hole and reinforces said wall around the hole.

3. The combination as claimed in claim 1, wherein said bearing face of the tightening means has such size relative to the size of said bottom face that, when it is in contact with the bottom face, space is provided between the tightening means and the part of the inner portion immediately adjacent said aperture, whereby when said tightening means is screwed along the shank and clamps the support element against said wall it is capable of deforming the inner portion so as to obtain a good seating thereon.

4. The combination as claimed in claim 1, wherein said tightening means comprise a nut and a washer interposed between the nut and said bottom face, said bearing face being formed on the washer.

5. The combination as claimed in claim 1, wherein said bearing face is substantially in the shape of a truncated convex dome so as to fit snugly in said bottom face.

References Cited in the file of this patent

UNITED STATES PATENTS

| | | |
|---|---|---|
| 824,330 | Barnard | June 26, 1906 |
| 1,171,738 | Mallet | Feb. 15, 1916 |
| 1,724,394 | Chamberlain | Aug. 13, 1929 |
| 1,934,972 | Frank | Nov. 14, 1933 |
| 1,963,535 | Trotter | June 19, 1934 |
| 1,977,880 | Howsam | Oct. 23, 1934 |
| 2,690,693 | Campbell | Oct. 5, 1954 |
| 2,748,594 | Edwards | June 5, 1956 |
| 2,811,839 | McReynolds | Nov. 5, 1957 |
| 2,854,824 | Currey et al. | Oct. 7, 1958 |
| 2,862,368 | Dempsey | Dec. 2, 1958 |

FOREIGN PATENTS

| | | |
|---|---|---|
| 920,781 | Germany | Nov. 29, 1954 |
| 1,005,474 | Germany | Apr. 4, 1957 |
| 1,039,973 | Germany | Oct. 2, 1958 |